United States Patent [19]

Natansohn et al.

[11] 4,278,643
[45] Jul. 14, 1981

[54] RESIN SORPTION PROCESS FOR EXTRACTING TUNGSTEN

[75] Inventors: Samuel Natansohn, Sharon; Sophia R. Su, Wellesley, both of Mass.

[73] Assignee: GTE Laboratories Incorporated, Waltham, Mass.

[21] Appl. No.: 186,949

[22] Filed: Sep. 15, 1980

[51] Int. Cl.³ ............................................. C01G 41/00
[52] U.S. Cl. ................................ 423/54; 75/101 BC; 423/279; 423/DIG. 14
[58] Field of Search .................. 423/54, DIG. 14, 279, 423/283, 658.5; 75/101 BE

[56] References Cited

U.S. PATENT DOCUMENTS 4,180,628  12/1979  Marchant et al. ...................... 423/54

OTHER PUBLICATIONS

Altringer et al., "Bureau of Mines, RI8315", Dept. of Interior, 1978, pp. 1-15.

Primary Examiner—Herbert T. Carter
Attorney, Agent, or Firm—Jerry F. Janssen

[57] ABSTRACT

In a resin sorption process for recovering tungsten from solutions containing high levels of contaminating boron by employing a resin copolymer of 8-hydroxyquinoline, a polyamine, resorcinol, and formaldehyde (HPRF resins), the improvement comprises a two step desorption of metal values from the loaded resin consisting of a first step of washing the loaded resin with a solution of a weakly acidic salt to remove a portion of the boron from the loaded resin, followed by a second step of washing the loaded resin with a solution of a weakly basic salt to remove a portion of the tungsten from the loaded resin, whereby the tungsten recovered is substantially free of contaminating boron.

9 Claims, 3 Drawing Figures

RESIN SORPTION PROCESS FOR EXTRACTING TUNGSTEN

BACKGROUND OF THE INVENTION

This invention relates to the recovery of metals from low level sources by extraction. More particularly, it is concerned with an improved resin sorption process for recovering tungsten from low level sources containing relatively high levels of contaminating boron.

Tungsten is an important component of alloy-hardened metals and is indispensable in the manufacture of electric heating elements and lamp filaments. The increasing value and scarcity of this vital metal require that efficient methods be found for recovering tungsten from low level sources. Important low level sources of tungsten are natural alkaline brines such as those of Searles Lake, Calif. Searles Lake is estimated to contain approximately 170 million pounds of tungsten trioxide, but at concentrations of only 50–70 parts per million.

Various processes have been proposed for the recovery of tungsten from such brines, but most are complex and result in the consumption of large amounts of reagent chemicals per pound of tungsten recovered or present problems of pollution or process waste disposal. U.S. Pat. No. 4,180,628 discloses a method of recovering tungsten from natural brines by employing a resin to sorb the metal values from solution followed by desorption of the metals from the resin using water or an alkali metal carbonate solution to recover the tungsten.

The tungsten recovered by prior art processes, however, often contains unacceptable levels of contaminating boron which must be removed by further processing steps before the tungsten can be advantageously used. The problem of boron contamination is particularly acute when the source of tungsten is a natural brine which contains low levels of the metal together with comparatively large amounts of borate salts.

SUMMARY OF THE INVENTION

In accordance with the method of this invention, tungsten may be recovered from natural brine solutions in a form substantially free of contaminating boron and phosphorus. The process for recovering tungsten from a solution containing high levels of boron comprises the steps of adjusting the pH of the solution and then contacting the solution with a resin comprising a copolymer of 8-hydroxyquinoline, a polyamine, resorcinol, and formaldehyde to load the resin with metal values, and then desorbing the metal values from the loaded resin to recover the tungsten. The improvement in accordance with this invention comprises a two step desorption of metal values from the loaded resin including a first step of washing the loaded resin with a solution of a weakly acidic salt to remove a portion of the boron from the loaded resin, followed by a second step of washing the loaded resin with a solution of a weakly basic salt to remove a portion of the tungsten from the loaded resin to recover tungsten substantially free of boron.

Figure 1:
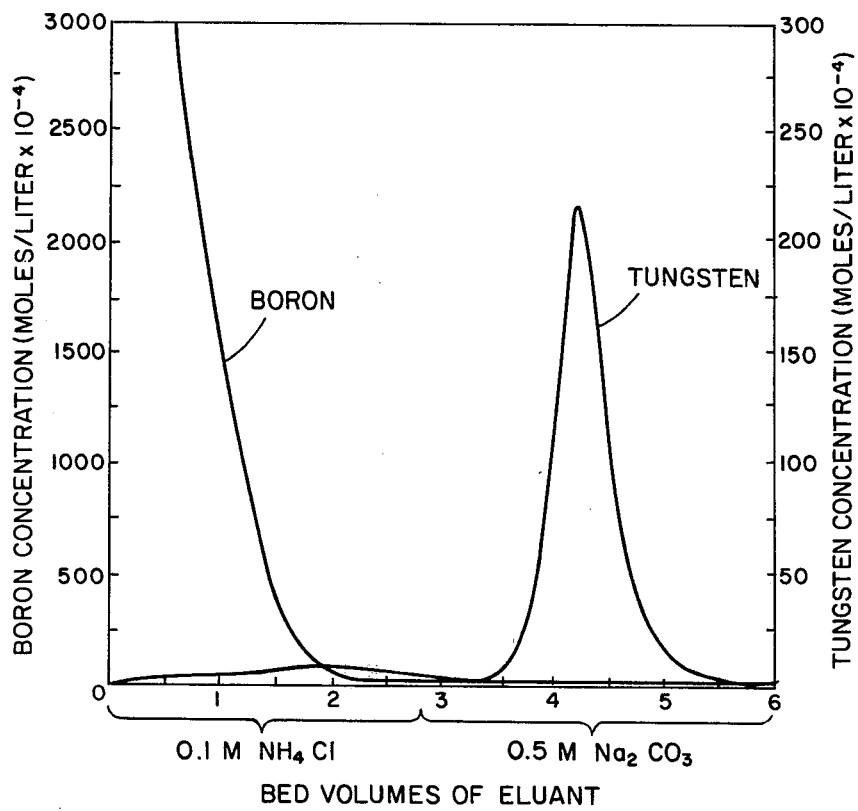
FIG. 1 is a graph illustrating the desorption of tungsten and boron from an ion exchange resin in a two step desorption method in accordance with the present invention.

For a better understanding of the present invention, together with other and further objects, advantages, and capabilities thereof, reference is made to the following disclosure in connection with the above-described drawings.

DETAILED DESCRIPTION

The process of this invention is effective for recovering tungsten in a form substantially free of contaminating boron from solutions which contain tungsten and relatively high concentrations of boron. The brine of Searles Lake, Calif., for example, contains boron in excess of 900 times the molar concentration of tungsten. The tendency of boron to form heteropolyanionic species in solution with tungsten complicates the isolation of pure tungsten from such sources. Species such as $(BW_{12}O_{40})^{-5}$ are known, for example, in which small amounts of boron are capable of complexing large amounts of tungsten. Since any boron remaining in refined tungsten tends to increase tungsten brittleness, it is important that contaminating boron be removed at as early a stage in the processing of the metal as possible.

U.S. Pat. No. 4,180,628 discloses a method of recovering tungsten from boron-containing alkaline brines by employing resin copolymers of 8-hydroxyquinoline, a polyamine, resorcinol, and formaldehyde (HPRF resins). As taught therein, the metal values are extracted from solution by the resin and then displaced from the resin by washing or elution with water or a solution of an alkali metal carbonate such as sodium carbonate.

In accordance with the present invention greatly improved separation of tungsten from boron is achieved by a two step desorption of metal values from metal loaded HPRF resins. According to the present invention, a tungsten-containing solution such as Searles Lake brine is first adjusted to a pH value of below about pH 8 by addition of an acid solution. The pH adjusted brine solution is then contacted with an HPRF resin to sorb the metal values from the solution onto the resin. The method of contacting may be either by a batch or by a column method.

In the embodiment employing the batch method, the resin is mixed with the tungsten containing solution for a period sufficient to sorb the metal values from solution or to saturate the resin with metal values. The tungsten sorbed on the loaded resin may then be separated from the resin in a form substantially free of contaminating boron by first washing the loaded resin with a dilute solution of a weakly acidic salt to remove most of the boron from the loaded resin. The term weakly acidic salt means a salt of a strong acid and a weak base, which salt tends to hydrolyze in aqueous solution to produce a pH below pH 7. Examples of such acid salts are the ammonium salts of hydrochloric, sulfuric, and nitric acids. Ammonium chloride is a preferred acid salt for displacing the boron from the loaded HPRF resin. Aqueous solutions of ammonium chloride having concentrations between about 0.05 M and 0.5 M are effective to displace the boron; solutions of about 0.1 M ammonium chloride have been found to be particularly effective.

After the major portion of boron has been removed from the loaded resin by washing with a solution of a weakly acidic salt, the tungsten values are displaced from the loaded resin by a second step of washing with a solution of a weakly basic salt. The term weakly basic salt means a salt of a weak acid and a strong base, which salt tends to hydrolyze in aqueous solution to produce pH above pH 7. Examples of such weakly basic salts are the sodium salts of carbonic acid, acetic acid, and other carboxylic acids. Sodium carbonate is a preferred salt for displacing tungsten from the loaded resin in the second step of washing. Aqueous solutions of sodium carbonate having concentrations between about 0.1 M and 1 M are effective in displacing the tungsten; solutions of about 0.5 M sodium carbonate have been found particularly effective.

In the embodiment employing the column process, the column bed is formed of the resin containing in a vertical column through which the tungsten containing solution is slowly passed. The tungsten feed solution is passed through the column until a decrease in the efficiency of tungsten extraction by the column indicates complete loading.

The loaded resin bed is then washed or eluted with a weakly acidic salt solution, preferably 0.1 M ammonium chloride solution. From ½ to 5 bed volumes are required to wash the loaded resin essentially free of boron, preferably about 2-3 bed volumes. The loaded resin bed is next subjected to a second washing or elution with a weakly basic salt solution, preferably 0.5 M sodium carbonate solution. From ½ to 5 bed volumes are required to wash the loaded resin essentially free of tungsten, preferably 2-3 bed volumes.

The improvement in accordance with this invention, comprising a two step washing or elution to remove sorbed metal values from an HPRF resin, has been found to result in the isolation of tungsten which is substantially free of boron. Typical recoveries of tungsten from the loaded HPRF resins by the improved process of this invention contain boron to tungsten molar ratios of less than 0.05 to 1, as compared with molar ratios of boron to tungsten in the brine feed solutions of about 900 to 1.

The accompanying Figures illustrate the improvement in separation of boron and tungsten by the process of this invention over prior art methods. In the Figures, elution curves for the desorption of tungsten and boron from loaded HPRF resins are plotted. Each Figure is a plot of the concentration of metal versus volume of eluant.

As shown by the elution curves of FIG. 1, almost complete separation of boron from tungsten is achieved by desorbing the two elements from a loaded HPRF resin by first washing of the loaded resin bed with slightly less than 3 bed volumes of 0.1 M ammonium chloride followed by a second washing of the loaded resin bed with slightly less than 3 bed volumes of 0.5 M sodium carbonate solution for a total volume of eluant of slightly less than 6 bed volumes. Moreover, the tungsten is eluted in a narrow elution band from the loaded resin bed by the process in accordance with this invention. This results in recovery of the tungsten desorbed from the loaded resin in a concentrated form simplifying further processing.

Figure 2:
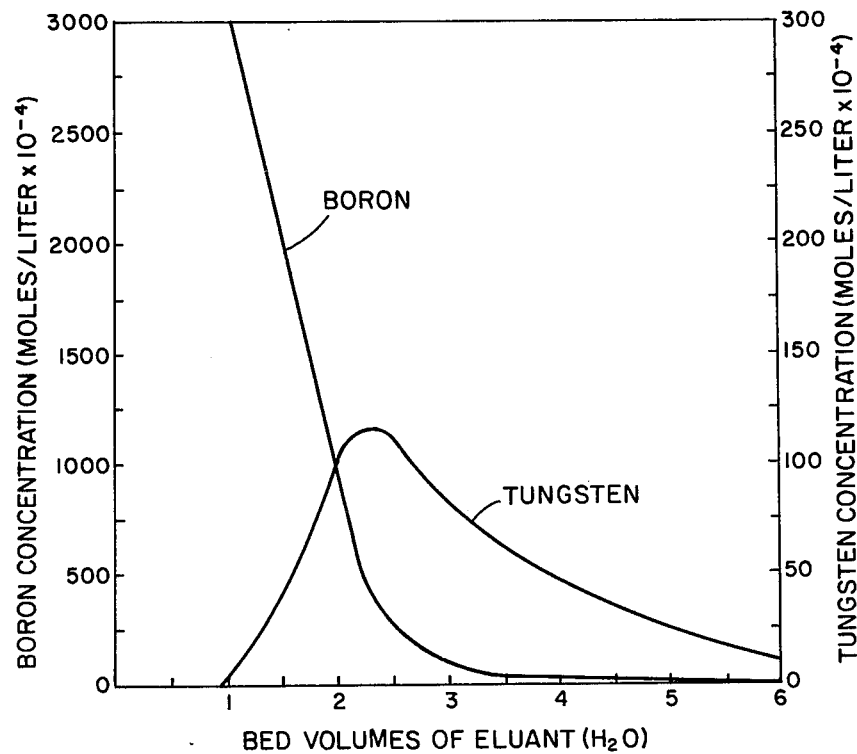
FIG. 2 is a graph illustrating the desorption of tungsten and boron from an ion exchange resin with water according to a prior art method.
Figure 3:
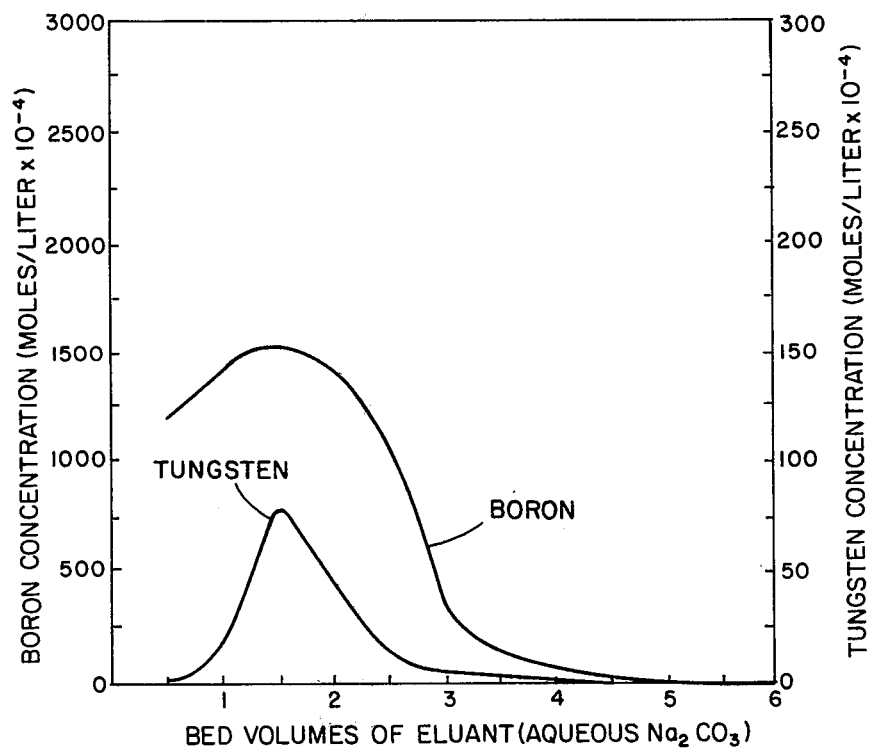
FIG. 3 is a graph illustrating the desorption of tungsten and boron from an ion exchange resin with sodium carbonate solution according to a prior art method.

FIGS. 2 and 3 illustrate elution curves for prior art processes which teach the desorption of sorbed boron and tungsten from loaded HPRF resins with water or sodium carbonate. In FIG. 2, the elution curves are shown for desorption of metal values from an HPRF resin with water employing conditions similar to those of FIG. 1. The extensive overlap of the boron and tungsten elution curves indicates incomplete separation of the two metals with resulting contamination of the recovered tungsten with boron. In addition, the "tailing" of the tungsten elution curve indicates that tungsten recovered by such a process is considerably diluted by eluant.

In FIG. 3, the elution curves are shown for desorption of metal values from an HPRF resin with 0.5 M sodium carbonate solution employing conditions similar to those of FIG. 1. The tungsten is eluted by sodium carbonate solution in a narrow elution band in concentrated form, but contaminated with boron simultaneously eluted from the loaded resin bed. For example, as shown by the data of Table 3 below, the eluate fraction containing the peak concentration of tungsten of FIG. 3 also contains approximately 17-18 times as much boron.

Although throughout the discussion above, continual reference is made to the applicability of the improved process of this invention to the recovery of tungsten from naturally occurring brine solutions such as Searles Lake brine, the process is not limited to such applications, but may be advantageously applied to the isolation of substantially boron free tungsten from any solution containing the two elements.

To enable one skilled in the art to better understand and practice the invention, the following examples are provided. These examples are not to be viewed as limiting the scope of the invention, but are merely illustrative thereof.

EXAMPLE I

A sample of HPRF resin was prepared in accordance with the teachings of U.S. Pat. No. 4,180,628 in which the polyamine component was ethylenediamine. A column using this resin was prepared, having a volume of 15.1 ml and a cross-sectional area of 0.66 cm$^2$. Searles Lake brine was adjusted to pH 7.5 by the addition of sulfuric acid. This pH-adjusted brine was passed through the ion exchange column at a rate of 20 ml/min cm$^2$. The addition of the brine feedstock to the column was halted when the effluent from the column indicated that the efficiency of extraction of tungsten had dropped below about 80%.

A solution of 0.1 M ammonium chloride was next passed through the column at a flow rate of 4 ml/min cm$^2$. The effluent from the column was collected in 10 ml portions, and each portion was analyzed for boron and tungsten content. The data from these analyses appear in Table 1. Further addition of ammonium chloride wash solution to the column was halted when 2.83 bed volumes of solution had passed through the resin bed.

Next a solution of 0.5 M sodium carbonate was passed through the column at a flow rate of 4 ml/min cm$^2$. The effluent from the column was collected in 10 ml portions, and each portion was analyzed for boron and tungsten. The data from these analyses appear in Table 1. Addition of sodium carbonate solution to the column was halted after 5.87 bed volumes of solution had passed through the resin bed.

The elution curves for boron and tungsten from the loaded resin bed are plotted in FIG. 1. The curves illustrate almost complete separation of the two elements with the tungsten eluted in a narrow band.

TABLE 1

| Eluate Fraction | Bed Volumes of Eluant | Metal Content of Fraction (M/L × 10⁻⁴) | | Eluant |
|---|---|---|---|---|
| | | Boron | Tungsten | |
| 1 | 0.217 | — | 1.05 | NH$_4$Cl |
| 2 | 0.652 | 2648. | 1.05 | NH$_4$Cl |
| 3 | 1.09 | 1300. | 1.71 | NH$_4$Cl |
| 4 | 1.52 | 346. | 7.11 | NH$_4$Cl |
| 5 | 1.96 | 64.8 | 5.08 | NH$_4$Cl |
| 6 | 2.39 | 30.0 | 4.39 | NH$_4$Cl |
| 7 | 2.83 | 18.0 | 3.62 | NH$_4$Cl |
| 8 | 3.26 | 14.2 | 2.73 | Na$_2$CO$_3$ |
| 9 | 3.70 | 9.86 | 8.24 | Na$_2$CO$_3$ |
| 10 | 4.13 | 10.4 | 222. | Na$_2$CO$_3$ |
| 11 | 4.57 | 10.7 | 76.7 | Na$_2$CO$_3$ |
| 12 | 5.00 | 10.6 | 16.5 | Na$_2$CO$_3$ |
| 13 | 5.43 | 7.67 | 5.57 | Na$_2$CO$_3$ |
| 14 | 5.87 | 6.27 | 2.94 | Na$_2$CO$_3$ |

EXAMPLE II

A sample of HPRF resin prepared as in Example I was used to prepare a column of 22 ml volume, having a cross-sectional area of 0.93 cm². The column was loaded with metal values from a pH-adjusted sample of Searles Lake brine as in Example I by passing the brine feedstock through the column at a flow rate of 4 ml/min cm².

The sorbed metal values were then eluted from the loaded resin bed using water, in accordance with prior art teachings. Water was passed through the loaded resin bed at a flow rate of 2 ml/min cm² and collected in 10 ml portions. Each portion was analyzed for boron and tungsten content and the date from these analyses appear in Table 2.

The elution curves for boron and tungsten from the loaded resin bed are plotted in FIG. 2. The elution curves show appreciable overlap, with extensive "tailing" of the tungsten elution curve.

TABLE 2

| Eluate Fraction | Bed Volumes of Eluant | Metal Content of Fraction (M/L × 10⁻⁴) | | Eluant |
|---|---|---|---|---|
| | | Boron | Tungsten | |
| 1 | 0.9 | 3780. | 0.86 | H$_2$O |
| 2 | 1.8 | 1130. | 93.1 | H$_2$O |
| 3 | 2.7 | 88.1 | 109. | H$_2$O |
| 4 | 3.6 | 26.5 | 54.5 | H$_2$O |
| 5 | 4.5 | 12.5 | 31.2 | H$_2$O |
| 6 | 5.4 | 5.94 | 16.4 | H$_2$O |
| 7 | 7.7 | 1.72 | 8.65 | H$_2$O |
| 8 | 10.0 | — | 4.33 | H$_2$O |

EXAMPLE III

A sample of HPRF resin prepared as in Example I was used to prepare a column of 15.1 ml volume and 0.66 cm² cross-sectional area. The column was loaded with metal values from a pH-adjusted sample of Searles Lake brine as in Example I by passing the brine feedstock through the column at a flow rate of 20 ml/min cm².

The sorbed metal values were then eluted from the loaded resin bed using 0.5 M sodium carbonate solution, in accordance with prior art teachings. Portions of the eluate were collected and analyzed for boron and tungsten content, and the data from these analyses appear in Table 3.

The elution curves for boron and tungsten eluted from the loaded resin bed have been plotted in FIG. 3. The elution curves indicate that there is no separation of the two elements using the indicated conditions.

TABLE 3

| Eluate Fraction | Bed Volumes of Eluant | Metal Content of Fraction (M/L × 10⁻⁴) | | Eluant |
|---|---|---|---|---|
| | | Boron | Tungsten | |
| 1 | 0.5 | 1276. | 1.91 | Na$_2$CO$_3$ |
| 2 | 1.0 | — | 21.6 | Na$_2$CO$_3$ |
| 3 | 1.5 | 1298. | 75.6 | Na$_2$CO$_3$ |
| 4 | 2.0 | — | 40.6 | Na$_2$CO$_3$ |
| 5 | 3.0 | 262. | 17.5 | Na$_2$CO$_3$ |
| 6 | 4.0 | — | 6.6 | Na$_2$CO$_3$ |
| 7 | 5.0 | 59.4 | 3.26 | Na$_2$CO$_3$ |
| 8 | 6.0 | — | 1.87 | Na$_2$CO$_3$ |
| 9 | 7.0 | 25.3 | 1.21 | Na$_2$CO$_3$ |
| 10 | 8.0 | — | 0.76 | Na$_2$CO$_3$ |
| 11 | 9.0 | 14.2 | 0.65 | Na$_2$CO$_3$ |

While there have been shown and described what is at present considered the preferred embodiments of the present invention, it will be obvious to those skilled in the art that various changes and modifications may be made therein without departing from the scope of the invention as defined by the appended claims.

What is claimed is:

1. In a process for recovering tungsten values from a solution containing boron comprising the steps of contacting said solution with a resin comprising a copolymer of 8-hydroxyquinoline, a polyamine, resorcinol, and formaldehyde to load said resin with metal values; and desorbing the metal values from said loaded resin to recover the tungsten; the improvement comprises a two step desorption of metal values from said loaded resin including a first step of contacting said loaded resin with a solution of a weakly acidic salt to remove a portion of the boron from said loaded resin, followed by a second step of contacting said loaded resin with a solution of a weakly basic salt to remove a portion of the tungsten from said loaded resin, whereby the tungsten recovered by said improvement is substantially free of boron.

2. The process in accordance with claim 1 wherein said polyamine is ethylenediamine.

3. The process in accordance with claim 1 wherein said weakly acidic salt comprises ammonium chloride.

4. The process in accordance with claim 1 wherein said weakly basic salt comprises sodium carbonate.

5. In a process for recovering tungsten values from a solution containing boron comprising the steps of passing said solution through a bed of a resin comprising a copolymer of 8-hydroxyquinoline, a polyamine, resorcinol, and formaldehyde to load said resin bed with metal values, and eluting the loaded resin bed to recover the tungsten; the improvement comprises a two step elution of metal values from said loaded resin bed including a first step of eluting said loaded resin bed with from ½ to 5 bed volumes of a solution of a weakly acidic salt to remove a portion of the boron from said loaded resin bed, followed by a second step of eluting said loaded resin bed with from ½ to 5 bed volumes of a solution of a weakly basic salt to remove a portion of the tungsten from said loaded resin bed, whereby the tungsten recovered by said improvement is substantially free of boron.

6. The process in accordance with claim 5 wherein said polyamine is ethylenediamine.

7. The process in accordance with claim 4 wherein said solution of a weakly acidic salt comprises from about 0.05 M to about 0.5 M ammonium chloride solution.

8. The process in accordance with claim 5 wherein said solution of a weakly basic salt comprises from about 0.1 M to about 1 M sodium carbonate solution.

9. The process in accordance to claim 1 or claim 5 wherein the molar ratio of boron to tungsten in said recovered tungsten is less than 0.05.

* * * * *